(12) United States Patent
Tatsuda (10) Patent No.: US 8,528,447 B2
(45) Date of Patent: Sep. 10, 2013

(54) INDEX TABLE

(75) Inventor: Yoshinori Tatsuda, Kanazawa (JP)

(73) Assignee: Tsudakoma Kogyo Kabushiki Kaisha, Kanazawa-Shi (JP)

( * ) Notice: Subject to any disclaimer, the term of this patent is extended or adjusted under 35 U.S.C. 154(b) by 237 days.

(21) Appl. No.: 12/936,148

(22) PCT Filed: Apr. 20, 2009

(86) PCT No.: PCT/JP2009/057823
§ 371 (c)(1),
(2), (4) Date: Oct. 1, 2010

(87) PCT Pub. No.: WO2009/131082
PCT Pub. Date: Oct. 29, 2009

(65) Prior Publication Data
US 2011/0023654 A1    Feb. 3, 2011

(30) Foreign Application Priority Data

Apr. 21, 2008    (JP) .................................. 2008-110498

(51) Int. Cl.
*B23Q 1/52*    (2006.01)
*B23Q 1/72*    (2006.01)
*B23Q 11/00*    (2006.01)

(52) U.S. Cl.
CPC ............. *B23Q 1/52* (2013.01); *B23Q 11/0028* (2013.01)
USPC ......................................... 74/813 R; 83/615

(58) Field of Classification Search
USPC ................ 74/49, 573.1, 813 R, 813 L, 814, 74/818, 819, 821, 823–825, 827; 279/5; 269/55, 57; 83/615; 464/180, 182
IPC ...................... B23Q 1/52,1/72, 11/00
See application file for complete search history.

(56) References Cited

U.S. PATENT DOCUMENTS

| | | | |
|---|---|---|---|
| 5,509,351 A * | 4/1996 | Kato ............................ | 100/282 |
| 2006/0185453 A1 | 8/2006 | Miyazawa et al. | |
| 2006/0185470 A1 | 8/2006 | Machida et al. | |
| 2007/0048101 A1 | 3/2007 | Beteille | |

FOREIGN PATENT DOCUMENTS

| | | |
|---|---|---|
| EP | 1 677 028 A1 | 7/2006 |
| JP | 10-225835 A | 8/1998 |
| JP | 2001-062653 A | 3/2001 |
| JP | 2001-277059 A | 10/2001 |
| JP | 2006-150539 A | 6/2006 |
| JP | 2007-508953 A | 4/2007 |
| WO | 2005038291 A1 | 4/2005 |
| WO | 2005038292 A1 | 4/2005 |

OTHER PUBLICATIONS

Extended European Search report dated Aug. 29, 2011 for corresponding EP Application No. 09735945.9.
International Search Report mailed on Jul. 21, 2009 for corresponding International Publication No. WO 2009/131082.
JP Notification of Reasons of Refusal with English Summary for JP Application No. 2008-110498 dispatched on Oct. 16, 2012 (4 pages).

* cited by examiner

*Primary Examiner* — James Pilkington
*Assistant Examiner* — Richard Urbanski
(74) *Attorney, Agent, or Firm* — Yoshida & Associates, LLC (57) ABSTRACT

In an unbalance torque compensating device, the supporting member has an engagement surface that receives, through the engaging portion, a first rotary torque T1 applied to the rotating shaft. The urging member causes a second rotary torque T2 in a direction opposite to the first rotary torque T1 to be generated at the rotating shaft through the engaging portion.

3 Claims, 7 Drawing Sheets

$T1 = R1 \times Wg \sin \theta$
$T2 = R2 \times F \sin \theta$

$T1 = R1 \times Wg \sin\theta$
$T2 = R2 \times F\cos\alpha \times \sin(\theta + \alpha)$

FIG. 7

INDEX TABLE

TECHNICAL FIELD

The present invention relates to an index table in which a rotating shaft, which supports a table to which a workpiece is secured, extends in a direction intersecting a vertical direction, for example, extends in a horizontal direction as in, for example, a tilting circular table.

BACKGROUND ART

In an index table in which a rotating shaft extends in a direction intersecting a vertical direction, a center-of-gravity position of objects or members supported by the rotating shaft, that is, drive members such as a table to which a workpiece is secured, a workpiece mounting jig, and the workpiece may become considerably biased from a center of axis of the rotating shaft. For example, for a tilting index table, a rotating shaft extends in a horizontal direction, and a center-of-gravity position of a table to which a workpiece is secured is considerably biased from a center of axis of a rotating shaft. By mounting the workpiece or a workpiece mounting jig, the center-of-gravity position of drive members is moved towards the rotating shaft to slightly reduce the biasing from the center of axis. However, as the drive members are made heavier, rotary torque applied to the rotating shaft, that is, unbalance torque resulting from the biasing of the center-of-gravity position is increased. Since the unbalance torque depends upon index angle, the unbalance torque varies considerably as a result of indexing the rotation. Therefore, a driving motor of the rotating shaft requires a capacity that corresponds to load variation. In addition, a drive transmission member, such as a shaft or a coupling, and the rotating shaft need to have a rigidity that corresponds to the load variation in order to prevent index precision from being impaired by twisting, in particular, twisting degree differing with each index angle.

Figure 6:
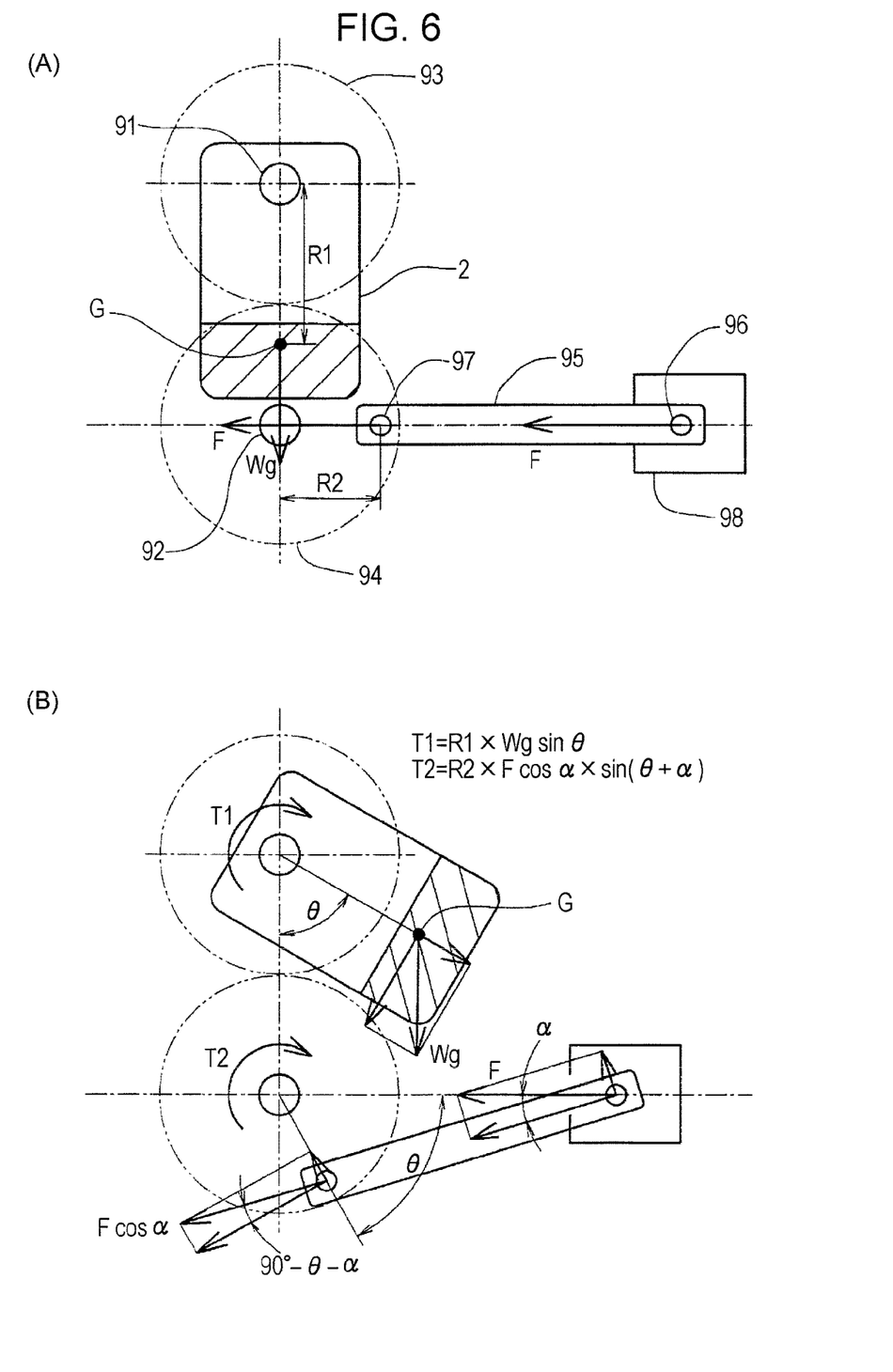
FIG. 6 is a schematic view showing the relationship between an unbalance torque and a compensation torque in a related index table.

As a device that compensates for and reduces such an unbalance torque, an unbalance torque compensating device shown in FIG. 6 is known. The unbalance torque compensating device is applied to a tilting index table. The device shown in FIG. 6 includes a rotating shaft 91 of a table 2 to which a workpiece is secured, a first gear 93 secured to the rotating shaft 91, a second shaft 92 that supports a second gear 94 engaging the first gear 93 and having the same number of teeth as the first gear 93, a crank arm 95 having one end connected to the second gear 94 at a position that is biased from a center of axis of the second shaft 92 through a crank pin 97, and a fluid-pressure cylinder device including a piston 98 connected to the other end of the crank arm 95 through a pin 96. A direction of an urging force F of the fluid-pressure cylinder device is perpendicular to an axis of the second shaft 92 (PTL1).

As shown in FIG. 6(A), when a center of gravity G of a drive member such as a table 2 exists directly below a center of axis of the rotating table 91 and on a vertical line passing through the center of axis, an unbalance torque (a first rotary torque T1) resulting from the weight of the drive member that is supported, that is, gravity Wg (W: the mass of the drive member, g: acceleration due to gravity) is not generated at the rotating shaft 91. In addition, at this time, an urging force F of the cylinder device is oriented towards a center of axis of the second shaft 92 through the crank pin 97, and compensation torque (a second rotary torque T2) is not generated at the second gear 94. When, as shown in FIG. 6(B), the table 2 rotates counterclockwise by θ as a result of rotation of the rotating shaft 91, the second gear 94 rotates clockwise by θ, so that the crank arm 95 rotates counterclockwise by α around the pin 96 as center while the crank arm 95 moves forward. If the distance between the crank pin 97 and the pin 96 is L, α is a function of θ expressed by α=arc sin(R2×sin θ/L).

By the gravity Wg, the counterclockwise first rotary torque T1 is applied to the rotating shaft 91 as an unbalance force. In addition, if the distance from the center of axis of the rotating shaft 91 to the center of gravity G of the drive member is R1, the first rotary torque T1 is determined by T1=Wg×R1×sin θ. A force in which the urging force F acts upon the crank pin 97 through the crank arm 95 becomes F×cos α, and, at 90°-θ-α, intersects a tangent to the crank pin 97, that is, a line that is orthogonal to a line connecting the center of axis of the second shaft 92 and the crank pin 97. Therefore, by the fluid-pressure cylinder device, the second rotary torque T2 in the clockwise direction is applied to the second gear 94. In addition, if the distance from the center of axis of the second shaft 92 to the crank pin 97 is R2, the second rotary torque T2 is determined by T2=R2×F×cos α×sin(θ+α).

The clockwise second torque T2 acting on the second gear 94 is transmitted to the rotating shaft 91 through the first gear 93 engaging the second gear 94, and acts as a counterclockwise rotary torque with respect to the rotating shaft 91, so that it acts as a compensation torque acting in a direction opposite to the unbalance torque. Therefore, an absolute value of the following rotary torque (obtained by subtracting the second rotary torque T2, applied by the fluid-pressure cylinder device, that is, the compensation torque, from the clockwise first rotary torque T1, applied by the gravity Wg, that is, the unbalance torque) is applied to the rotating shaft 91 as a clockwise or a counterclockwise correction torque, so that a load of, for example, a driving motor of the rotating shaft 91 is reduced.

$$T1-T2=Wg \times R1 \times \sin\theta - R2 \times F \times \cos\alpha \times \sin(\theta+\alpha)$$

As mentioned above, α is a function of θ, and the correction torque T1-T2 is a function of θ, so that it changes along with a rotational angle θ of the table 2. Therefore, in order to minimize the correction torque T1-T2, and to maintain it at a certain value, it is necessary to change the urging force F of the fluid-pressure cylinder device as the table 2 rotates, so that control of the urging force F at the fluid-pressure cylinder device is required.

An unbalance torque compensating device differing from the above-described device is known. In this device, instead of connecting the fluid-pressure cylinder device to the second gear and applying an urging force thereto, a balance weight is mounted to the second gear, to compensate for an unbalance torque. In the device, the balance weight is mounted to the second gear at a location that is biased from a center of axis, and is provided with a space for rotation thereof for preventing interference with other devices and injury to an operator (PTL 2).

CITATION LIST

Patent Literature

PTL 1: Japanese Unexamined Patent Application Publication No. 2005-246522
PTL 2: Japanese Unexamined Patent Application No. 2006-150538

SUMMARY OF INVENTION

Technical Problem

In a device that compensates for an unbalance torque applied to a rotating shaft of an index table, control of urging force for compensating for the unbalance torque as a table rotates is not particularly required, and a space for rotation of a balance weight for preventing interference is not required.

Solution to Problem

The present invention presupposes an index table in which a rotating shaft supporting a table to which a workpiece is secured and extending in a direction intersecting a vertical direction is index driven.

[1] The present invention provides a structure comprising a rotating member that is secured to a rotating shaft or that is supported by a second shaft differing from the rotating shaft, the rotating member rotating by an amount that is the same as that of the rotating shaft as a result of transmission of rotation of the rotating shaft to the rotating member through a rotation transmission mechanism; a supporting member provided so as to be capable of reciprocating in a direction intersecting a center of axis of the rotating member; and an urging member for the supporting member, wherein the rotating member has an engaging portion that engages the supporting member at a bias position separated from the center of axis, wherein the supporting member has an engagement surface that receives, through the engaging portion, a first rotary torque applied to the rotating shaft by a weight supported by the rotating shaft, and wherein the urging member causes a second rotary torque in a direction opposite to the first rotary torque to be generated at the rotating shaft through the engaging portion.

[2] In addition, in the aforementioned present invention, it is possible for the rotating member to be supported by the second shaft, the rotation transmission mechanism to include a first circular member and a second circular member, the first circular member being secured to the rotating shaft, the second circular member being supported by the second shaft and having a diameter that is the same as that of the first circular member, and the first and second circular members to transmit rotations directly to each other or transmit the rotations to each other through an intermediate member, so that the rotating member rotates by the amount that is the same as that of the rotating shaft.

[3] Further, in the aforementioned present invention, it is possible for a phase of the engaging portion with respect to the rotating member to be set so that the second rotary torque becomes a maximum or substantially the maximum when the first rotary torque in a rotation range of the rotating shaft is a maximum.

[4] Further, in the aforementioned invention, in order to stabilize reciprocation movement of the supporting member and to efficiently transmit urging force of the urging member to the rotating member through the supporting member, it is desirable that the index table include a displacement restricting device of the supporting member. The displacement restricting device is provided for the supporting member and includes two restricting members and two moving members, the two restricting members being provided at the frame so that one is disposed at one side of an axis of the rotating shaft to which the rotating member is secured and the other is disposed at the other side of the axis of the rotating shaft to which the rotating member is secured or so that one is disposed at one side of an axis of the second shaft that supports the rotating member and the other is disposed at the other side of the axis of the second shaft that supports the rotating member, the two moving members being provided at the supporting member and contacting the respective restricting members, wherein one of the moving member and the restricting member disposed at the one side has a guide surface that is parallel to a direction of reciprocation of the supporting member, and the other of the moving member and the restricting member disposed at the one side has a sliding contact surface that slidingly contacts the guide surface or a plurality of rolling members that contact the guide surface, and wherein one of the moving member and the restricting member disposed at the other side has a guide surface that is parallel to the direction of reciprocation of the supporting member, and the other of the moving member and the restricting member disposed at the other side has a sliding contact surface that slidingly contacts the guide surface or a plurality of rolling members that contact the guide surface.

Advantageous Effects of Invention

[1] According to the present invention, since the rotating member is secured to the rotating shaft or is supported by the second shaft differing from the rotating shaft, and rotates by an amount that is equal to that of the rotating shaft through the rotation transmission mechanism, the engaging portion of the rotating member rotates by an amount that is equal to that of the rotating shaft. Since the supporting member is provided so as to be capable of reciprocating in the direction intersecting the center of axis of the rotating member, urging force of the urging member acts upon the engaging portion parallel to the direction of intersection with the center of axis of the rotating member through the supporting member. Therefore, the second rotary torque applied to the rotating member changes more precisely in accordance with a change in the first rotary torque, applied to the rotating shaft by the weight that the rotating shaft supports, resulting from the rotation of the rotating shaft. Therefore, the rotary torque applied to the rotating member is reduced, so that a load of a driving source that index drives the rotating shaft is reduced.

[2] In addition, the rotating member is not secured to the rotating shaft, and is secured to the second shaft differing from the rotating shaft; and rotates through the rotation transmission mechanism including the first circular member, secured to the rotating member, and the second circular member, supported by the second shaft and having the same diameter as the first circular member. Therefore, when adjusting a phase relationship between the first circular member and the second circular member, it is possible to work without being interfered by the urging member. Consequently, it is possible to easily adjust a phase relationship between the rotating shaft and the rotating member.

[3] For the weight that the rotating shaft supports, the phase at the center-of-gravity position with respect to the rotating shaft changes when a workpiece and a workpiece mounting jig are changed. In the present invention, the phase of the engaging portion with respect to the rotating member is set so that the second rotary torque becomes a maximum or substantially the maximum when the first rotary torque is a maximum. Therefore, it is possible to take measures against changes in the center-of-gravity position when the workpiece and the workpiece mounting jig is changed, and to reduce the first rotary torque by efficiently compensating for it by the second rotary torque.

[4] Since a couple of forces act upon the supporting member interposed between the urging member and the engaging member, the supporting member tries to rotate and tilt, that is, tries to undergo rotation displacement. However, at either side of an axis of the rotating shaft, or at either side of an axis of the second shaft, the displacement restricting device including moving members and restricting members restrict the rotation displacement of the supporting member. Therefore, urging force of the urging member is efficiently transmitted to the engaging portion of the rotating member through the supporting member.

BEST MODES FOR CARRYING OUT THE INVENTION

Figure 1:
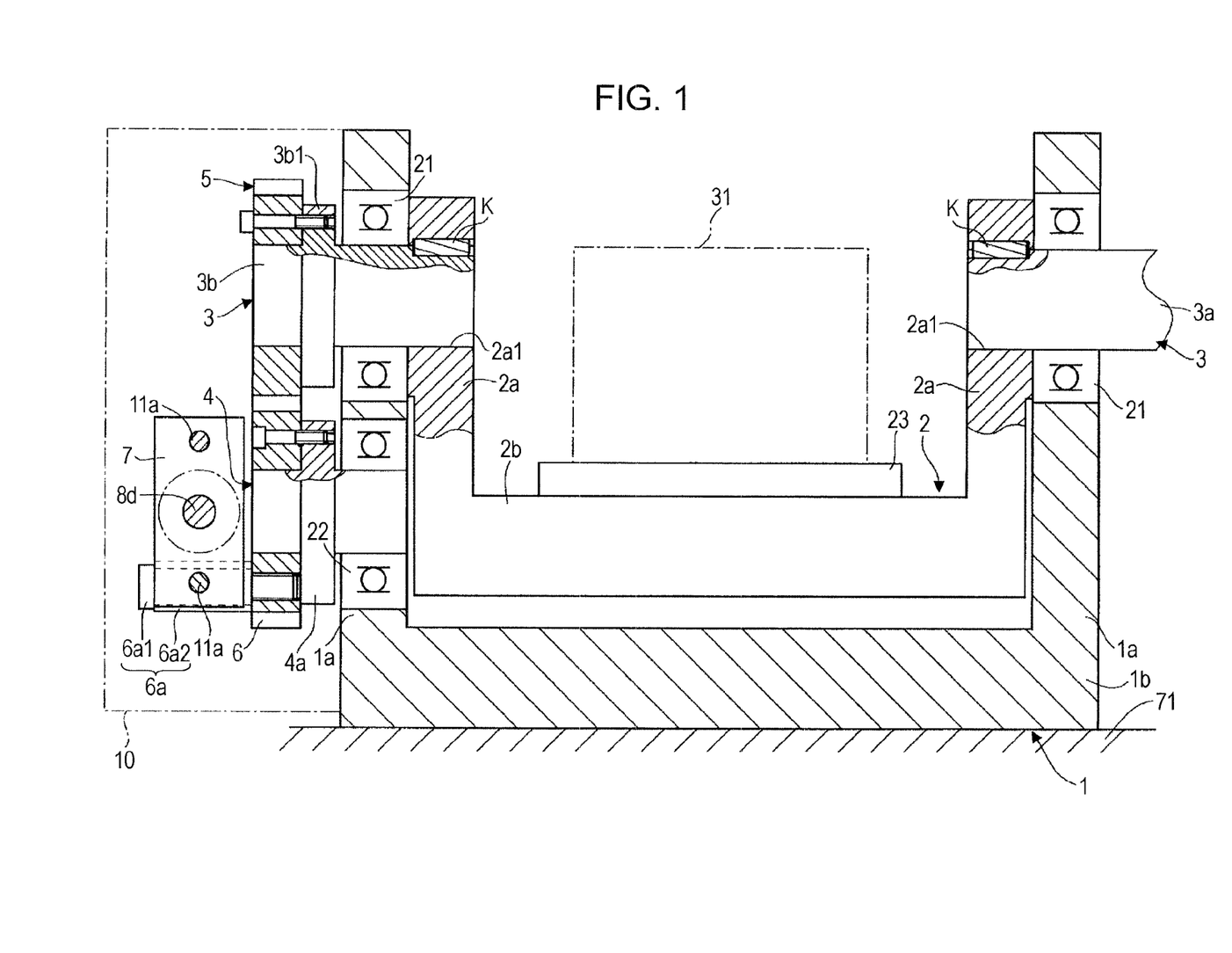
FIG. 1 is a front view of an index table according to an embodiment of the present invention.
Figure 2:
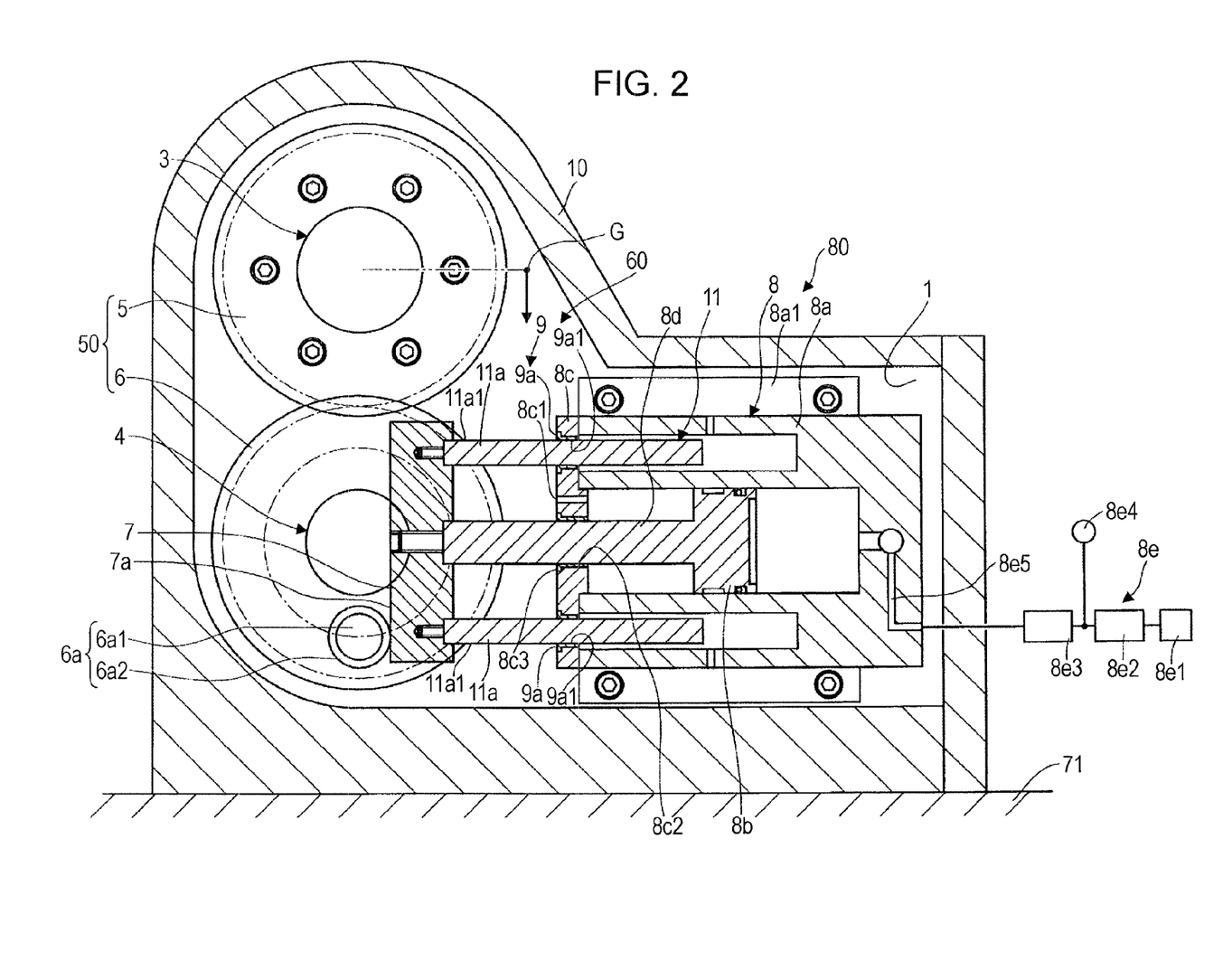
FIG. 2 shows the index table according to the embodiment of the present invention, and is a left view of FIG. 1.
Figure 5:
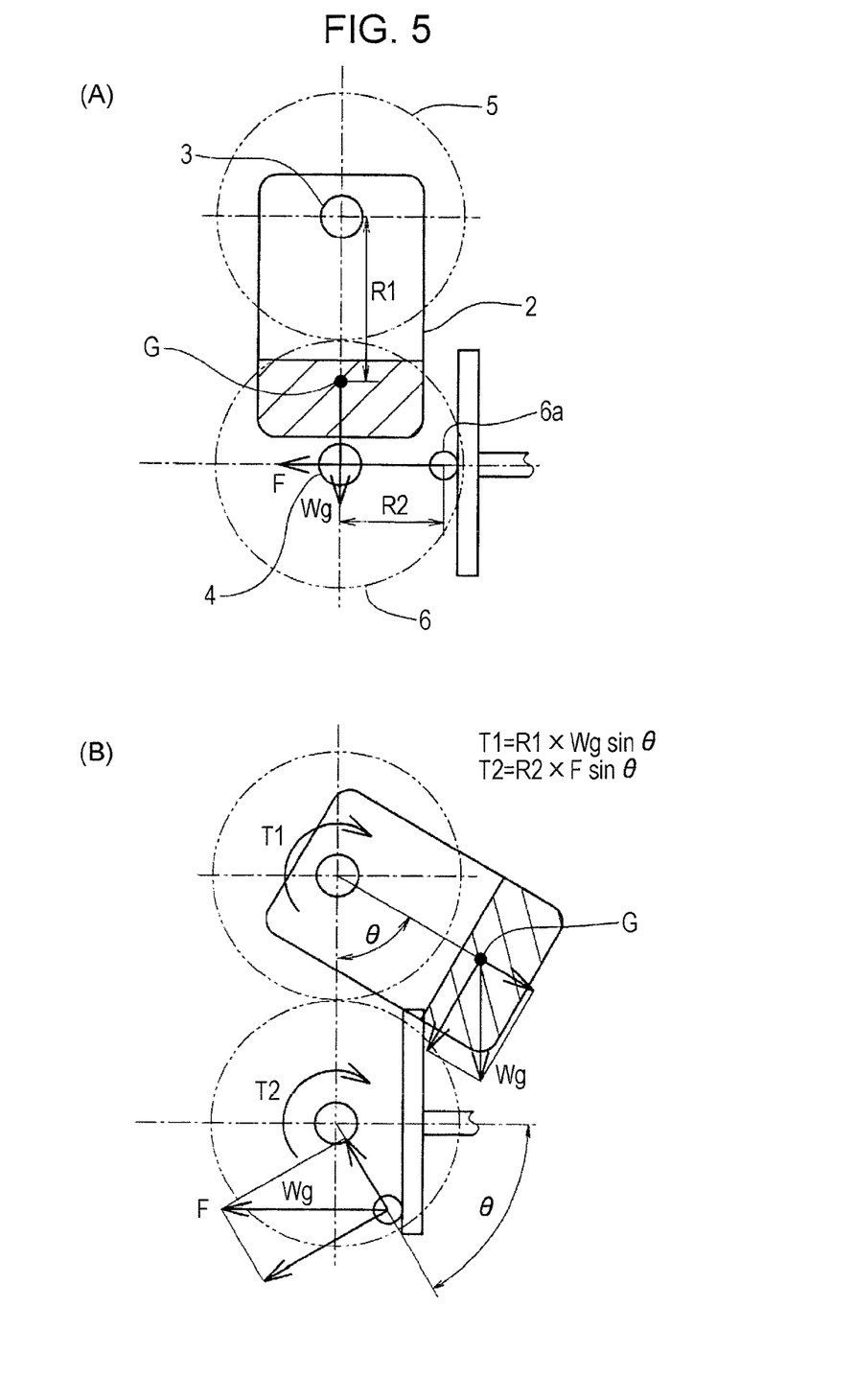
FIG. 5 is a schematic view showing the relationship between an unbalance torque and a compensation torque in the embodiment shown in FIG. 1.

An index table according to an embodiment of the present invention will hereunder he described with reference to the drawings. FIG. 1 is a front view of the entire structure of an index table according to one embodiment. FIG. 2 is a left view of FIG. 1. FIG. 5 is a schematic view showing the positional relationship between an engaging portion 6a and a center of gravity G of a drive member supported by a rotating shaft 3, and the relationship between an unbalance torque and a compensation torque.

In the index table according to the embodiment, the present invention is applied to what is called a tilting index table that processes a workpiece 31 that is supported by tilting the workpiece 31 at a predetermined angle, and the rotating shaft 3 supporting a table 2 upon which the workpiece 31 is placed extends horizontally and is orthogonal to a vertical direction. The basic structure of the tilting index table includes a frame 1, the table 2, and the rotating shaft 3. The frame 1 is set at a horizontal surface or an inclined surface of, for example, a head 71 of a machine tool. The table 2 is rotatably supported by the frame 1 and has the workpiece 31 placed thereupon. The rotating shaft 3 is supported by the frame 1, is secured to the table 2, and rotatably supports the table 2 with respect to the frame 1. In the embodiment, the frame 1 is placed at the horizontal surface.

The frame 1 has a U shape whose rotating-shaft side is open, and includes a pair of support frames 1a and a base frame 1b. The pair of support frames 1a are provided in a standing manner so as to be separated from each other, one at the outer left side and one at the outer right side of the table 2. The base frame 1b extends towards the left and right, and connects the lower end portions of the pair of support frames 1a to each other. The base frame 1b is secured to the head 71 with, for example, a bolt.

The table 2 is placed inwardly of the frame 1. Similarly to the frame 1, the table 2 has a U shape whose rotating-shaft side is open, and includes a pair of arms 2a and a base 2b. The pair of arms 2a are provided in a standing manner so as to be separated from each other, one at the outer left side and one at the outer right side. The base 2b connects one end of each arm 2a to each other.

The rotating shaft 3 is formed of separate members, a drive-side rotating shaft 3a (right side in FIG. 1) and a driven-side rotating shaft 3b, which project inwardly in an axial direction, pass through the pair of arms 2a of the table 2, are fitted to a pair of fitting holes 2a1 that are coaxial with respect to each other, and are relatively unmovable through a key K and a push screw (not shown). Accordingly, the rotating shaft 3 is integrated to the table 2. In other words, the drive-side rotating shaft 3a and the driven-side rotating shaft 3b are coaxially connected to each other through the table 2, to form one rotating shaft 3.

A pair of bearings 21 are coaxially fitted to the pair of support frames 1a. The drive-side rotating shaft 3a and the drive-side rotating shaft 3b are inserted into inner rings of the respective bearings 21, so that the table 2 is rotatably supported at the frame 1 at both ends of the frame 1. The drive-side rotating shaft 3a is connected to a driving motor through a rotation transmission device such as a coupling and a worm speed reducing gear (not shown). The drive-side rotating shaft 3a constitutes a rotor shaft of the driving motor, and is directly driven rather than being driven through the rotation transmission device.

The base 2b of the table 2 has a workpiece placement surface that is parallel to the rotating shaft 3. Not only may the workpiece placement surface be integrated to a body of the base 2b as a securing surface, but also may be rotatably supported at the body of the base 2b so as to be capable of being rotationally indexed around an axis orthogonal to the rotating shaft 3 as center. The workpiece 31 is secured directly to the workpiece placement surface or is secured to the workpiece placement surface through a mounting workpiece mounting jig 23 with, for example, a bolt or a dolly block as shown in FIG. 1.

In addition to the above-described structural components, the index table according to the invention includes a rotating member, a rotation transmission mechanism 50, an engaging portion 6a, a supporting member 7, an urging member 80, a displacement restricting device 60 of the supporting member 7, and a case 10 of these members and the device. The rotating member is provided at a second shaft 4 differing from the rotating shaft 3. The rotation transmission mechanism 50 rotates the rotating member by an amount that is the same as that of the rotating shaft 3. The engaging portion 6a is provided at the rotating member. The supporting member 7 receives a first rotary torque T1, generated at the rotating shaft 3, from the rotating member through the engaging portion 6a. The urging member 80 urges the supporting member 7 for applying to the rotating member a second rotary torque T2 in a direction opposite to the first rotating torque T1.

Through a bearing 22 that is parallel to the rotating shaft 3, the second shaft 4, which differs from the rotating shaft 3, is supported at the support frame 1a, which supports the drive-side rotating shaft 3b, of the pair of support frames 1a of the frame 1. The second shaft 4 and the driven-side rotating shaft 3b project outwardly of the support frame 1a. A first gear 5 and a second gear 6 having the same number of teeth are removably secured to a flange 3b1 of the driven-side rotating shaft 3b and a flange 4a of the second shaft 4, respectively, through bolts; and engage each other. The first gear 5 becomes a first circular member, secured to the rotating shaft 3, and the second gear 6 becomes a second circular member, supported by the second shaft 4, thereby constituting the rotation transmission mechanism 50.

Not only does the second gear 6 constitute the second circular member, but also the second gear 6 is provided with the engaging portion 6a, thereby constituting the rotating member is formed. That is, at a side surface of the second gear 6 opposite to the table 2, a pin 6a1 is provided in a standing manner by screwing and a roller 6a2 is rotatably supported at positions that are biased from the center of axis of the second shaft 4. By the pin 6a1 and the roller 6a2, the engaging portion 6a contacting an engagement surface 7a of the supporting member 7 (described later) and engaging the supporting member 7 is formed. Therefore, a radial outer portion of the second gear 6 constitutes the second circular member, and engages the first gear 5, which constitutes the first circular member. A radial inner portion of the second gear 6 has the engaging portion 6a, and constitutes the rotating member.

The case 10 is secured to the outer side of the support frame 1a that supports the driven-side rotating shaft 3b. A fluid-pressure cylinder device 8 is provided at the case 10 as the urging member 80. The fluid-pressure cylinder device 8 includes a cylinder block 8a, a piston 8b, a cylinder head 8c, and a piston rod 8d. The cylinder block 8a is secured to the support frame 1a with a bolt. The piston 8b reciprocates in the cylinder block 8a. The cylinder head 8c closes an open end of the cylinder block 8a. The piston rod 8d is connected to the piston 8b and projects out from the cylinder head 8c. The fluid-pressure cylinder device 8 also includes a fluid supplying circuit 8e that supplies high-pressure fluid into the cylinder block 8a.

The cylinder block 8a has a bottom and has a circular cylindrical shape. A direction of extension of an axis, that is, a direction of reciprocation of the piston 8b is oriented through the center of axis of the second shaft 4; and a direction intersecting the axis of the second shaft 4 is the vertical direction in the embodiment.

The cylinder head 8c has an air removing hole 8c1, an insertion hole 8c2, and a guide bush 8c3. The air removing hole 8c1 connects an internal space of the cylinder block 8a and the outside to each other. The insertion hole 8c2 receives the piston rod 8d. The guide bush 8c3 is provided at the insertion hole 8c2. The rectangular parallelepiped supporting member 7 is secured to an end of the piston rod 8d.

The fluid supplying circuit 8e includes a high-pressure fluid supplying source 8e1, a regulator 8e2, a pressure gage 8e4, an opening-closing valve 8e3, and a flow path 8e5. The high-pressure fluid supplying source 8e1 includes, for example, a compressor or a hydraulic pump. The regulator 8e2 adjusts the pressure of a fluid from the high-pressure fluid supplying source 8e1. The opening-closing valve 8e3 switches between fluid supply and supply stop. The flow path 8e5 connects the opening-closing valve 8e3 and a pressure chamber formed in the cylinder block 8a to each other. The pressure of the fluid from the high-pressure fluid supplying source 8e1 is adjusted by manually operating the regulator 8e2, so that urging force of the fluid-pressure cylinder device 8 is set.

As shown in the schematic view of FIG. 5, when the workpiece 31 is mounted to the table 2, the center of gravity G of the drive members including the workpiece 31, the workpiece mounting jig 23, and the table 2 is disposed at a location that is biased from the center of axis of the rotating shaft 3. Other than when the center of gravity G is positioned on a vertical line extending through the center of axis of the rotating shaft 3 (directly above or below the center of axis), rotary torque is generated at the rotating shaft 3 by the weight, that is, the gravity of the drive members. With the position where the center of gravity G exists on the vertical line extending through the center of axis of the rotating shaft 3 (directly below the center of axis in FIG. 5(A)) being a rotation reference position of the table 2, if the table 2 is rotated counterclockwise by θ due to rotation of the rotating shaft 3, the second gear 6 (secured to the second shaft 4, engaging the first gear 5, and having the same number of teeth as the first gear 5) rotates clockwise by θ. If the center of gravity G of the drive members rotates counterclockwise by θ, the mass of the drive members is W, the acceleration due to gravity is g, and the biasing amount of the center of gravity G from the rotating shaft 3 is R1, the rotary torque T1 applied to the rotating shaft 3 is resented by the following formula as a clockwise unbalance torque: $T1 = R1 \times Wg \times \sin\theta$ When the second gear 6 rotates, the engaging portion 6a rotates clockwise by θ around the center of axis of the second shaft 4 as center. A predetermined force, that is, a predetermined urging force from the fluid-pressure cylinder device 8 is applied to the engaging portion 6a through the engagement surface 7a of the supporting member 7 in a direction parallel to a direction that intersects the center of axis of the second shaft 4. If the urging force of the fluid-pressure cylinder device 8 is F, and the distance between the center of axis of the second gear 6 and the engaging portion 6a is R2, the rotary torque T2 applied to the second gear 6 by the fluid-pressure cylinder device 8 is represented by the following formula as clockwise rotary torque: $T2 = R2 \times F \times \sin\theta$. The rotary torque T2 of the second gear 6 is transmitted to the first gear 5 engaging the second gear 6, and acts as a counterclockwise compensation torque upon the rotating shaft 3 through the first gear 5, and reduces an unbalance torque applied to the rotating shaft 3. The rotary torque applied to the rotating shaft 3 is represented by the following formula as correction torque:

$$T1 - T2 = (R1 \times Wg - R2 \times F) \times \sin\theta$$

According to the formula, in order for $R1 \times Wg - R2 \times F \approx 0$, that is, $F \approx R1 \times Wg/R2$, the workpiece 31 and the workpiece mounting jig 23 mounted to the workpiece placement surface of the table 2 are changed. In accordance with changes in the weight of the drive members and the biasing amount R1 of the center of gravity G, the urging force F of the fluid-pressure cylinder device 8 is adjusted, so that a correction torque is small regardless of the rotational angle θ of the table 2 from the reference position.

The setting of the urging force F of the fluid-pressure cylinder device 8 and the setting of the phase at the rotating shaft 3 and the second gear 6 serving as the rotating member are executed, for example, as follows. The workpiece 31 and the workpiece mounting jig 23 are mounted to the table 2. The first gear 5 is removed from the rotating shaft 3. The driving motor is rotated at a low speed, and a determination is made on the basis of, for example, an electrical current value, to stop the driving motor at a rotation angle at which the load is a maximum. The center of gravity G of the drive members is positioned on a horizontal line extending through the rotating shaft 3. The second gear 6 is rotated to position the engaging portion 6a at a vertical line extending through the center of axis of the second shaft 4. The first gear 5 is mounted to the rotating shaft 3 while the first gear 5 engages the second gear 6. The flange 3b1 of the rotating shaft 3 is provided with an internally threaded portion corresponding to bolt holes of the first gear 5, with the number of teeth of the internally threaded portion being an integral multiple of the number of bolt holes. They may be engaged without rotating the second gear 6 by a large amount. Therefore, phase matching between the rotating shaft 3 and the rotating member can be substantially precisely performed. On the basis of an unbalance torque estimated from, for example, the electrical current value of the driving motor, the regulator 8e2 is adjusted to adjust the fluid pressure, and to set the fluid-pressure cylinder device 8 to a predetermined urging force.

FIG. 2 shows a case in which the center of gravity G of the drive members exists on the horizontal line extending through the center of axis of the rotating shaft 3, that is, a case in which the table 2 is rotated counterclockwise by 90° from the rotation reference position shown in FIG. 5(A), and an index rotation angle θ=90°. The piston 8*b* of the fluid-pressure cylinder device 8 is constantly urged by a predetermined fluid pressure. The piston rod 8*d* urges the supporting member 7, mounted to an end of the piston rod 8*d*, by a predetermined urging force F in a direction that is orthogonal to the axis of the second shaft 4. Through the engagement surface 7*a* contacting the roller 6*a*2 of the second gear 6, the supporting member 7 presses the roller 6*a*2 by the predetermined urging force F in a direction parallel to a direction of extension of the piston 8*b*, that is, in a direction parallel to a direction of reciprocation of the supporting member 7. The supporting member 7 receives an urging force having the same magnitude as F from the piston rod 8*d* and an opposing force having the same magnitude as F from the roller 6*a*2 when the roller 6*a*2 is pressed. Therefore, the forces that are parallel to each other, that are in opposite directions, and that have the same magnitude, that is, a couple of forces, act upon the supporting member 7, causing the supporting member 7 to become rotationally displaced. Consequently, the piston 8*b* becomes twisted, thereby preventing the piston 8*b* from performing a smooth reciprocation movement. Thus, not only is the fluid-pressure cylinder device 8 damaged and worn, but also the urging force F is lost. Depending upon the rotation angle θ, the rotation force resulting from the couple of forces differs, and the amount of loss of the urging force caused by the twisting of the piston 8*b* differs. Therefore, in order to sufficiently reduce the correction torque, it is necessary to control the urging force by controlling the fluid pressure on the basis of the rotation angle θ. Consequently, it is desirable to provide the urging member 80 so as not to be influenced by the couple of forces. For example, when, in the fluid-pressure cylinder device 8, the piston 8*b* is formed to a sufficient length, and the outside diameter, that is, a cylinder hole diameter is formed to a sufficient magnitude, or the guide bush 8*c*3 is formed so as to have a sufficient length and a sufficient hole diameter, it is possible to restrict the twisting caused by the couple of forces, so that the piston 8*b* can smoothly reciprocate.

In the embodiment, in order to reduce the rotational displacement of the supporting member 7 caused by the couple of forces, in particular, the displacement restricting device 60 is provided. The displacement restricting device 60 includes two shafts 11*a* and guide metals 9*a*. The shafts 11*a* are provided as moving members 11 at the supporting member 7 on respective sides of the axis of the second shaft 4, and extend parallel to the direction of reciprocation of the piston 8*b*. The guide metals 9*a* are provided as restricting members 9 (provided at the frame 1) at the cylinder head 8*c* on respective sides of the axis of the second shaft 4 in correspondence with the shafts 11*a*. The guide metals 9*a* are provided with guide surfaces 9*a*1 at inner peripheral surfaces thereof. When the outer peripheral surfaces of the shafts 11*a*, that is, sliding contact surfaces 11*a*1 contact the guide surfaces 9*a*1 of the guide metals 9*a*, the rotational displacement of the supporting member 7 is restricted. Therefore, when the piston rod 8*d* reciprocates, that is, the supporting member 7 reciprocates, the sliding contact surfaces 11*a*1 of the shafts 11*a* smoothly slide along the guide surfaces 9*a*1 of the guide metals 9*a* without cracks formed by twisting. In particular, in the present invention, since the sets of guide metals 9*a* serving as the restricting members 9 and the shafts 11*a* serving as the moving members 11 are provided on the respective sides of the axis of the second shaft 4, it is possible to sufficiently restrict the rotational displacement of the supporting member 7.

Although, in the embodiment, the second shaft 4 is rotatably provided through the bearing 22 provided at the frame 1, the second shaft 4 may be secured to the frame 1 by, for example, press-fitting it into a fitting hole. In this case, a rolling bearing or a sliding bearing is interposed between the second gear 6 and the second shaft 4, and the second gear 6 is rotatably supported by the second shaft 4.

In the embodiment, the engaging portion 6*a* is provided at the second gear 6, and the second gear 6 constitutes the rotating member. However, a circular member or a non-circular member, such as a lever, may be provided at the second shaft 4 separately of the second gear 6, and the engaging portion 6*a* may be provided at these members.

Figure 7:
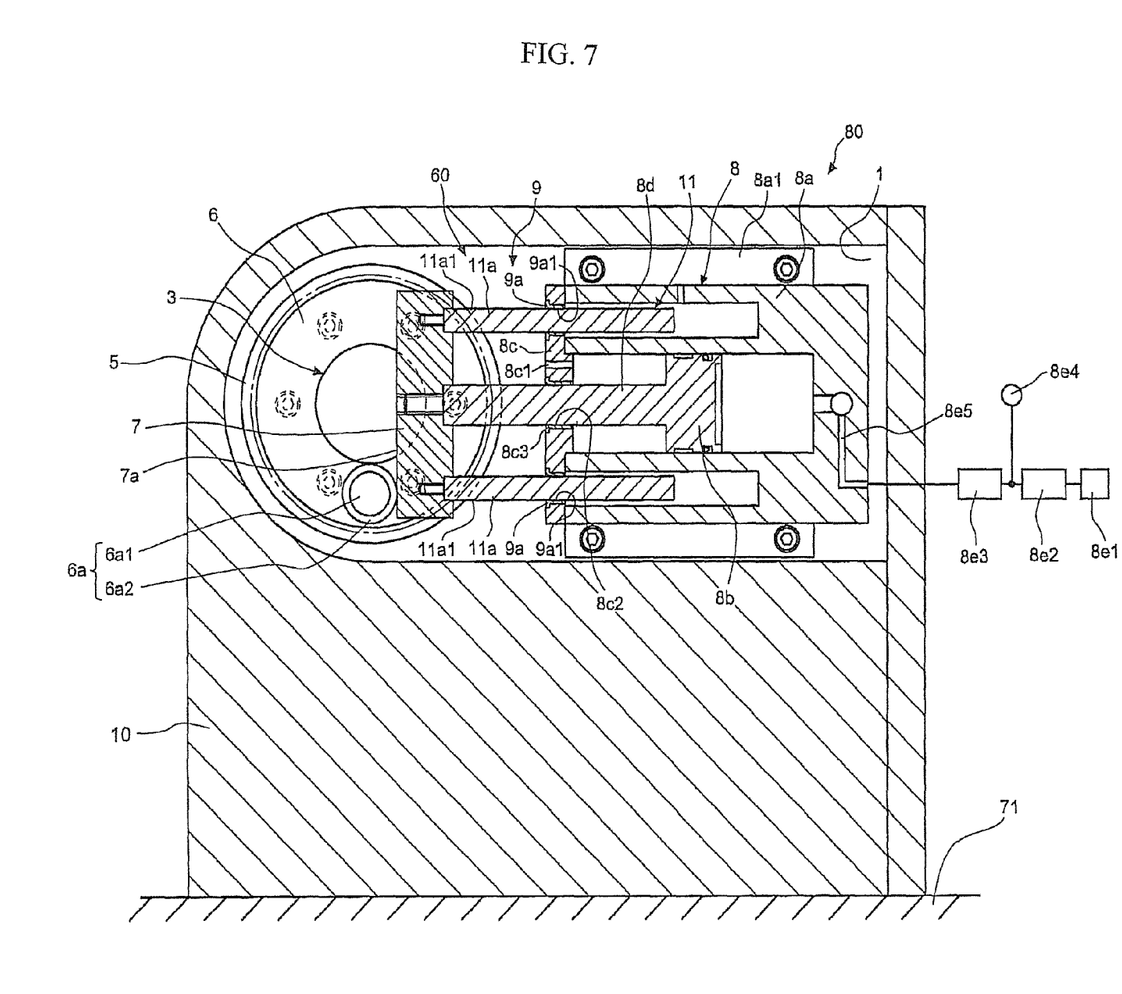
FIG. 7 shows the index table according to another embodiment of the present invention.

In the embodiment, the engaging portion 6*a* is provided at the second gear 6, and the second gear 6 constitutes the rotating member 6. However, as shown in FIG. 7, a circular member 6, serving the rotating member, or a non-circular member, such as a lever, may be provided at the rotating shaft 3, and the engaging portion 6*a* may be provided at these members, in which case, the rotation transmission mechanism 50 can be omitted.

In the embodiment, the engagement surface 7*a* of the supporting member 7 is formed by a planar surface that is orthogonal to the urging direction of the urging member 80. However, the planar surface that is orthogonal to the biasing direction of the urging member 80 may be a slightly inclined planar surface, an arc-shaped protruding surface, or a recessed surface. The engagement surface 7*a* has a sufficient length, and the engaging portion 6*a* can contact the engagement surface 7*a* over one rotation of the rotating shaft 3. However, when the range of rotation of the rotating shaft 3 is restricted, the engaging portion 6*a* may be such as to be capable of contacting the engagement surface 7*a* only over the range of rotation of the rotating shaft 3.

Figure 3:
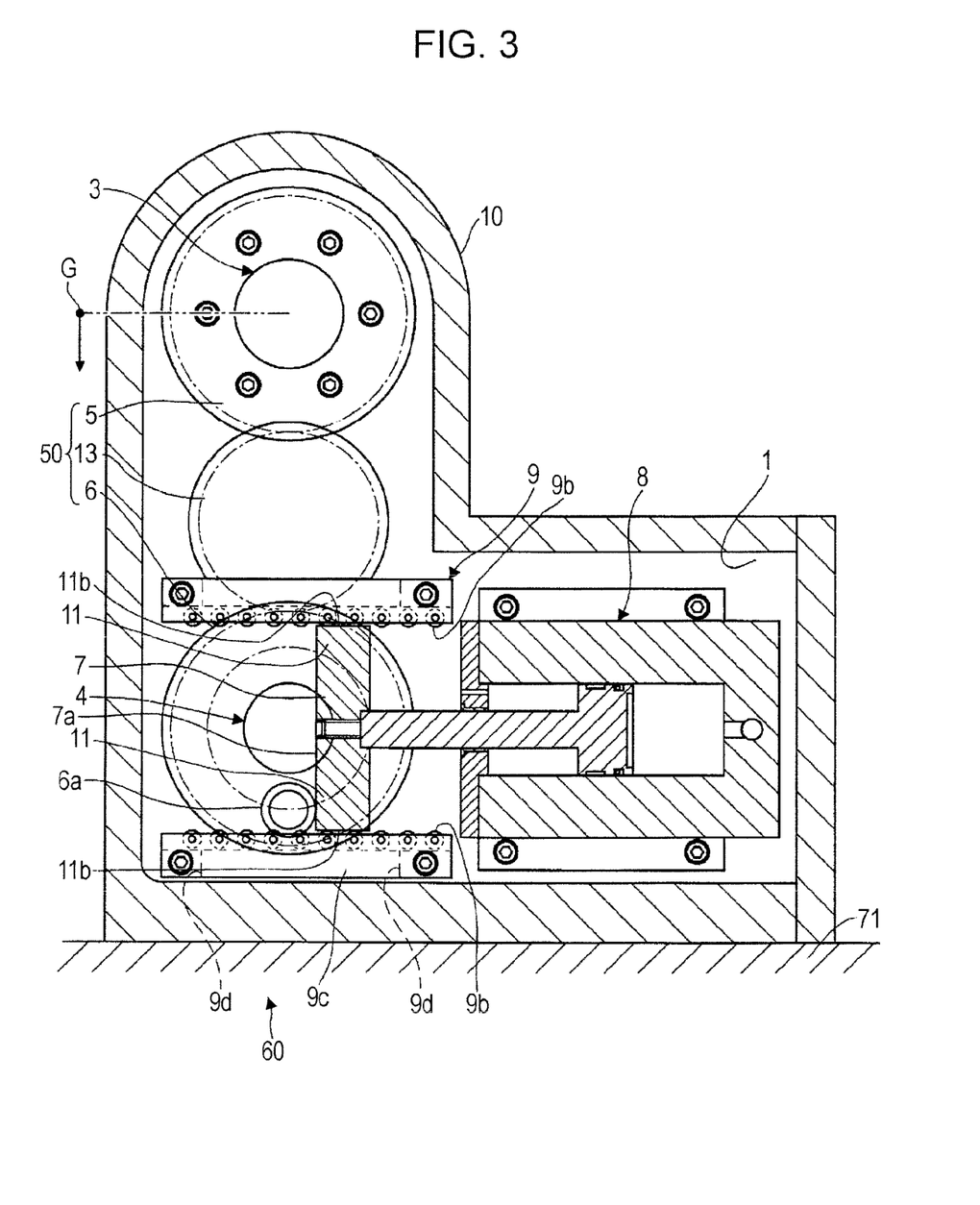
FIG. 3 shows a modification of the embodiment of the index table according to the present invention.

FIG. 3 shows a modification of the embodiment of the index table, with the structures of the rotation transmission mechanism 50 and the displacement restricting device 60 having distinctive characteristics.

The rotation transmission mechanism 50 is a gear mechanism provided with an idle gear 13 as an intermediate member disposed between the first gear 5 and the second gear 6. The idle gear 13 is axially rotatably supported at the frame 1.

The displacement restricting device 60 uses the upper and lower portions of the supporting member 7 as the moving members 11. That is, the upper and lower surfaces of the parallelepiped supporting member 7 are formed as guide surfaces 11*b* in a direction parallel to the direction of reciprocation of the supporting member 7. A plurality of rollers 9*b*, which are rolling members disposed in rows at intervals along the direction of reciprocation of the supporting member 7, are used as the restricting members 9. Therefore, the guide surfaces 11*b* have sufficient lengths in the direction of reciprocation of the supporting member 7, and the guide surfaces 11*b* constantly face two or more of the rollers 9*b*. The displacement restricting device 60 has pairs of moving members 11 and restricting members 9, one pair disposed at each side of the second shaft 4. The rotational displacement of the supporting member 7 caused by the couple of forces is restricted, and the supporting member 7 moves while rotating the rollers 9*b*. Here, the supporting member 7 moves while rolling resistance is applied instead of sliding resistance. Therefore, the supporting member 7 can reciprocate more smoothly.

The plurality of rollers 9*b* are supported by the frame 1. More specifically, using pins, the plurality of rollers 9*b* are rotatably provided at roller holders 9*c* having roller accommodation grooves. Both ends of each roller holder 9*c* are secured to the frame 1 through distances 9*d* with bolts.

Similarly to FIG. 2, FIG. 3 shows a state in which the compensation torque T2 resulting from the fluid-pressure cylinder device 8 is a maximum, that is, a state in which the unbalance torque T1 resulting from the drive members is a maximum. The rotation transmission mechanism 50 uses the idle gear 13. Therefore, the position of the center of gravity G of the drive members exists at a horizontal position on the right of the center of axis of the rotating shaft 3 in FIG. 3, whereas it exists at a horizontal position on the left in the modification.

In the embodiment, the rollers 9b are supported by the frame 1 through the roller holders 9c, and the guide surfaces 11b are formed at portions of the moving members 11 at the supporting member 7. However, it is possible to provide the rollers 9b at the moving members 11 secured to the supporting member 7, and to provide the restricting members 9 at the frame 1. The restricting members 9 have guide surfaces extending in the direction of reciprocation of the supporting member 7.

In the modification, rolling members are used at the displacement restricting device 60 and, when matching the phases of the rotating shaft 3 and the second gear 6, in order to make the first gear 5 removable without interference with the roller holders 9c, the idle gear 13 is provided as an intermediate member between the first gear 5 and the second gear 6. However, when, at a side of the axis of the second shaft 4, as shown in FIG. 2, only the displacement restricting device 60 at the first-gear-5 side is secured to the supporting member 7 using the shafts 11a as the moving members 11, and is provided at the cylinder head 8c using the guide metals 9a as the restricting members 9, the first gear 5 may be made removable without providing the idle gear 13. In this case, the structural members of the pairs of restricting members 9 and moving members 11 of the displacement restricting device 10 on the respective sides of the axis of the second shaft 4 differ from each other.

Figure 4:
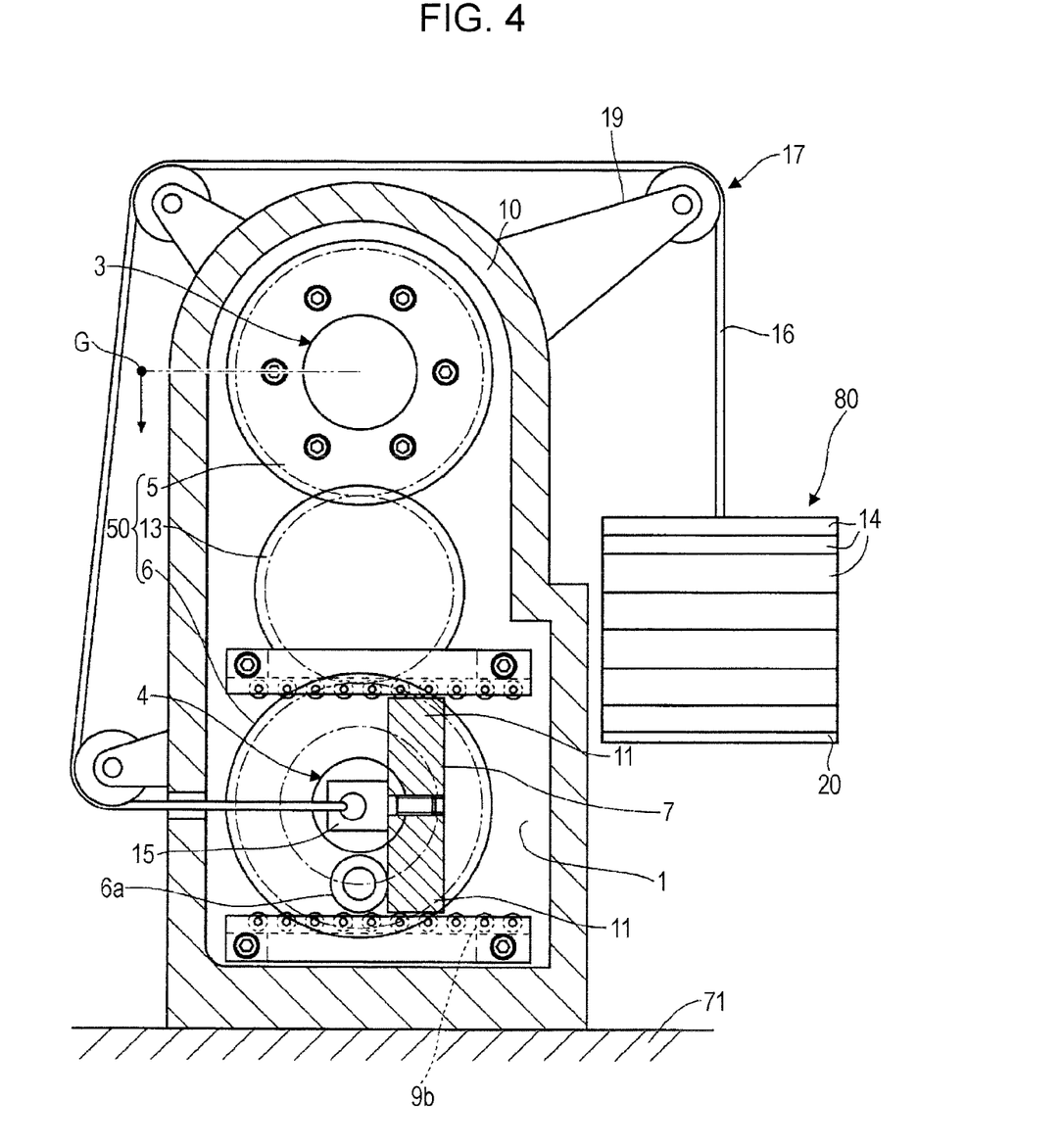
FIG. 4 shows a different modification of the embodiment of the index table according to the present invention.

FIG. 4 shows a different modification of the index table, with the use of weights 14 at the urging member 80 being a distinctive feature.

The urging member 80 includes a plurality of weights 14, a wire rope 16, and a rope pulling device 17. One end of the wire rope 16 is secured to a weight base 20, and the other end of the wire rope 16 is secured to the supporting member 7 through a rope holder 15. The rope pulling device 17 converts a pull direction of the wire rope 16 resulting from the weights of the weights 14 into the direction of reciprocation of the supporting member 7. In order to restrict swinging of the weights 14 caused by an upward/downward movement, a weight guide may be provided at the case 10 so as to contact guide holes provided in the weights 14 or the outer peripheral surfaces of the weights 14.

In order to provide the weights 14 at locations that are as high as possible, the rope pulling device 17 is provided with a plurality of pulleys mounted to the case 10 and having the wire rope 16 tightly stretched along the outer side of the case 10. By placing the weights 14 having different weights upon each other, the urging force F is adjusted, and the predetermined second rotary torque T2 is generated.

In the embodiment and the modifications, for the urging member 80 the fluid-pressure cylinder 8 or the weights 14 are used. However, a resilient member, such as a compression spring, may be used as the urging member 80. In this case, one end of the compressed compression spring is supported by a movement supporting device, and the other end of the compression spring is made to contact the supporting member 7. Using, for example, a dedicated motor, in response to the rotation of the rotating shaft 3, the movement supporting device is moved, so that urging force of the compression spring is kept at a constant value.

The rotation transmission mechanism 50 may use a plurality of pulleys or sprockets, serving as first and second circular members; or a belt or a chain, wound upon the sprockets or the pulleys, serving as intermediate members. For example, a first timing belt pulley and a second timing belt pulley having the same number of teeth are provided, and timing belts are wound upon both pulleys.

To rotate the second shaft 4 by the same amount as the rotating shaft 3 also means to rotate the second shaft 4 by substantially the same amount (a difference of within 10%). For example, if gears, timing belt pulleys, or sprockets are used at the first circular member and the second circular member, the difference in the number of teeth of within 10% is included; or if V pulleys are used in the circular members, a pitch circle difference of within 10% is included. The urging force applied to the engaging portion 6a can compensate for the first rotary torque, that is, the unbalance torque T1 over at least a practical rotation range of the rotating shaft 3.

The first gear 5 is secured to the rotating shaft 3 through a bolt, and can be removed when phase matching of the rotating member including the engaging portion 6a, that is, the second gear 6 and the rotating shaft 3 is performed. However, it is possible to secure the first gear 5 to the rotating shaft 3 in a single step by interposing an intermediate member, such as Schepin ring (trade name) (manufacturer: Ringfeder in Germany), between the first gear 5 and the rotating shaft 3. In this case, when the first gear 5 is secured by operating the intermediate member, frictional force is generated so as not to allow the first gear 5 and the rotating shaft 3 to move relative to each other. When performing phase matching between the second gear 6 and the rotating shaft 3, the frictional force is eliminated to make it possible for the first gear 5 and the rotating shaft 3 to rotate relative to each other.

The positional relationship between the first gear 5 and the second gear 6 constituting the first circular member and the second circular member of the rotation transmission mechanism 50 is that the second gear 6 exists below the first gear 5, and that the center of axis of the second gear 6 exists on the vertical line at the center of axis of the first gear 5. However, the center of axis of the second gear 6 may exist above the center of axis of the first gear 5. Alternatively, the center of axis of the second gear 6 need not be positioned on the vertical line at the center of axis of the first gear 5. For example, it may exist on a horizontal line at the center of axis of the first gear 5. Although the direction of reciprocation of the supporting member 7 is a horizontal direction, it need not be a horizontal direction as long as the direction intersects the axis of the rotating member. For example, the direction of reciprocation of the supporting member 7 may be a direction that is 45° from the horizontal direction.

In the above-described embodiment and modifications, a tilting index table is used as the index table, and the tilting of the workpiece placement surface of a table 2 is changed with the rotation of the rotating shaft 3. However, the present invention may be used in a general index table in which a workpiece placement surface of a table 2 is tilted with respect to a horizontal plane, and the tilt is maintained to a constant tilt regardless of the rotation angle of a rotating shaft 3. The present invention is also applied to a general index table in which a workpiece placement surface of the table 2 is tilted by at least 45° with respect to the horizontal plane. In the general index table in which the workpiece placement surface is tilted by at least 45° with respect to the horizontal plane, that is, in which a rotating shaft 3 is tilted by at least 45°, such as 90°, with respect to a vertical line, when the center of gravity G of drive members is biased by a large amount from the center of axis of the rotating shaft 3, the unbalance torque T1 is changed by a large amount due to the rotation index angle of the rotating shaft 3, as a result of which load variations of the driving motor is large. However, when the present invention is applied, the load variations of the driving motor are reduced.

The present invention is not limited to the above-described embodiment and modifications. Various modifications can be made without departing from the scope of the claims of the present invention.

REFERENCE SIGNS LIST 1 frame
1a support frame
1b base frame
2 table
2a arm
2b base
2a1 fitting hole
3 rotating shaft
3a drive-side rotating shaft
3b driven-side rotating shaft
3b1 flange
4 second shaft
4a flange
5 first gear (first circular member)
6 second gear (rotating member, second circular member)
6a engaging portion
6a1 pin
6a2 supporting member
7a supporting member
7a engagement surface
8 fluid-pressure cylinder device
8a cylinder block
8a1 bracket
8b piston
8c cylinder head
8c1 air removing hole
8c3 guide bush
8d piston rod
8e fluid supplying circuit
8e1 high-pressure fluid supplying source
8e2 regulator
8e3 opening-closing valve
8e4 pressure gage
8e5 flow path
9 restricting member
9a guide metal
9a1 guide surface
9b roller
9c roller holder
9d distance
10 case
11 moving member
11a shaft
11a1 sliding contact surface
11b guide surface
13 idle gear
14 weight
15 rope holder
16 wire rope
17 rope pulling device
19 pulley
20 weight base
21 bearing
22 bearing
23 workpiece mounting jig
31 workpiece
50 rotation transmission mechanism
60 displacement restricting device
71 head
80 urging member
K key
G center of gravity

The invention claimed is:

1. An index table in which a first rotating shaft that supports a table, to which a workpiece is secured, and that extends in a direction intersecting a vertical direction is index driven, the index table comprising:
a rotating member that is secured to the first rotating shaft or that is supported by a second rotating shaft , the rotating member rotating by an amount that is the same as that of the first rotating shaft as a result of transmission of rotation of the first rotating shaft to the rotating member through a rotation transmission mechanism;
a supporting member provided so as to be capable of reciprocating in a direction intersecting a center of axis of the rotating member;
an urging member for urging the supporting member; and
a displacement restricting device that restricts rotation displacement of the supporting member,
wherein the rotating member has an engaging portion that engages the supporting member at a bias position separated from the center of axis,
wherein the supporting member has an engagement surface that extends over a range in which the engaging portion is displaced as the first rotating shaft rotates 360 degrees, and that receives, through the engaging portion, a first rotary torque applied to the rotating shaft by a weight supported by the rotating shaft,
wherein the urging member causes a second rotary torque in a direction opposite to the first rotary torque to be generated at the rotating shaft through the engaging portion,
wherein the displacement restricting device includes two restricting members and two moving members, the two restricting members being provided in a frame so that one is disposed at one side of an axis of the first rotating shaft to which the rotating member is secured and the other is disposed at the other side of the axis of the first rotating shaft to which the rotating member is secured or so that one is disposed at one side of an axis of the second shaft that supports the rotating member and the other is disposed at the other side of the axis of the second rotating shaft that supports the rotating member, the two moving members being provided at the supporting member and each contacting a corresponding one of the restricting members,
wherein one of the moving member and the restricting member disposed at the one side of the axis has a guide surface that is parallel to a direction of reciprocation of the supporting member, and the other of the moving member and the restricting member disposed at the one side has a sliding contact surface that slidingly contacts the guide surface or a plurality of rolling members that contact the guide surface,
wherein the displacement restricting device restricts the rotation displacement of the supporting member caused by forces that act between the urging member and the engaging portion, the forces being parallel to each other, being in opposite directions, and having the same magnitude.

2. The index table according to claim 1, wherein the rotating member is supported by the second rotating shaft and constitutes a portion of the rotation transmission mechanism,
>wherein the rotation transmission mechanism includes a first circular member that is secured to the first rotating shaft and that has a diameter that is the same as that of the rotating member, and
>wherein the first circular member and the rotating member are directly connected to each other or connected to each other through an intermediate member, and rotate by an amount that is the same as that of one of the first rotating shaft and the second rotating shaft as the first rotating shaft rotates.

3. The index table according to claim 2, wherein a phase of the engaging portion with respect to the rotating member is set so that the second rotary torque becomes a maximum or substantially the maximum when the first rotary torque in a rotation range of the rotating shaft is a maximum.

* * * * *